(12) United States Patent
Winger et al.

(10) Patent No.: US 7,551,232 B2
(45) Date of Patent: Jun. 23, 2009

(54) NOISE ADAPTIVE 3D COMPOSITE NOISE REDUCTION

(75) Inventors: Lowell L. Winger, Waterloo (CA); Pavel Novotny, Waterloo (CA); Yunwei Jia, Milton (CA)

(73) Assignee: LSI Corporation, Milpitas, CA (US)

( * ) Notice: Subject to any disclaimer, the term of this patent is extended or adjusted under 35 U.S.C. 154(b) by 663 days.

(21) Appl. No.: 11/273,304

(22) Filed: Nov. 14, 2005

(65) Prior Publication Data

US 2007/0109448 A1    May 17, 2007

(51) Int. Cl.
*H04N 5/00* (2006.01)
*G06K 9/40* (2006.01)

(52) U.S. Cl. .................. 348/607; 348/609; 348/610; 348/624; 348/699; 382/261

(58) Field of Classification Search ................ 348/607, 348/609, 610, 624, 699; 382/261
See application file for complete search history.

(56) References Cited

U.S. PATENT DOCUMENTS

| | | | | |
|---|---|---|---|---|
| 4,651,211 A | * | 3/1987 | Weckenbrock et al. | 348/702 |
| 5,446,501 A | * | 8/1995 | Takemoto et al. | 348/620 |
| 5,590,064 A | * | 12/1996 | Astle | 708/203 |
| 5,990,978 A | * | 11/1999 | Kim et al. | 348/663 |
| 6,061,100 A | * | 5/2000 | Ward et al. | 348/607 |
| 6,181,382 B1 | * | 1/2001 | Kieu et al. | 348/459 |
| 6,281,942 B1 | * | 8/2001 | Wang | 348/607 |
| 6,297,847 B1 | * | 10/2001 | Fisch | 348/447 |
| 6,359,658 B1 | * | 3/2002 | He et al. | 348/607 |
| 6,473,460 B1 | * | 10/2002 | Topper | 375/240.16 |
| 6,674,488 B1 | * | 1/2004 | Satoh | 348/663 |
| 6,807,300 B1 | * | 10/2004 | Gindele et al. | 382/167 |
| 6,823,086 B1 | * | 11/2004 | Dolazza | 382/261 |
| 6,903,782 B2 | * | 6/2005 | Herman et al. | 348/625 |
| 6,914,638 B2 | * | 7/2005 | Tsui | 348/663 |
| 6,958,783 B2 | * | 10/2005 | Alvarez | 348/618 |
| 7,012,651 B2 | * | 3/2006 | Kondo et al. | 348/624 |
| 7,064,793 B2 | * | 6/2006 | Hahn et al. | 348/619 |
| 7,075,581 B1 | * | 7/2006 | Ozgen et al. | 348/448 |
| 7,139,035 B2 | * | 11/2006 | Kempf | 348/607 |
| 7,139,037 B1 | * | 11/2006 | Tsyrganovich | 348/650 |
| 7,158,189 B2 | * | 1/2007 | Alvarez | 348/618 |
| 7,206,027 B2 | * | 4/2007 | De Haan et al. | 348/448 |
| 7,308,153 B1 | * | 12/2007 | Wang | 382/262 |
| 2002/0101543 A1 | * | 8/2002 | Ojo et al. | 348/607 |
| 2003/0052996 A1 | * | 3/2003 | Thompson et al. | 348/448 |
| 2004/0189875 A1 | * | 9/2004 | Zhai et al. | 348/669 |
| 2004/0252895 A1 | * | 12/2004 | Hur et al. | 382/236 |
| 2005/0018086 A1 | * | 1/2005 | Lee et al. | 348/700 |
| 2005/0018767 A1 | * | 1/2005 | Lee | 375/240.1 |
| 2005/0025243 A1 | * | 2/2005 | Sohn et al. | 375/240.16 |
| 2005/0025342 A1 | * | 2/2005 | Lee et al. | 382/107 |
| 2005/0063464 A1 | * | 3/2005 | Shives et al. | 375/240.12 |

(Continued)

*Primary Examiner*—Brian P Yenke
(74) *Attorney, Agent, or Firm*—Christopher P. Maiorana, PC (57) ABSTRACT

A method for filtering digital video is disclosed. The method generally includes the steps of (A) checking a plurality of original blocks in an original field for a plurality of artifacts, wherein detection of the artifacts is based on an adjustable threshold, (B) first filtering each of the original blocks having at least one of the artifacts to remove the at least one artifact and (C) second filtering each of the original blocks lacking at least one of the artifacts to remove noise, wherein the second filtering is (i) motion compensated and (ii) adaptive to a respective noise level in each of the original blocks.

21 Claims, 5 Drawing Sheets

U.S. PATENT DOCUMENTS

| | | | |
|---|---|---|---|
| 2005/0134740 A1* | 6/2005 | Bacche | 348/638 |
| 2005/0244063 A1* | 11/2005 | Kwon et al. | 382/233 |
| 2006/0066728 A1* | 3/2006 | Batur | 348/208.99 |
| 2006/0114994 A1* | 6/2006 | Silverstein | 375/240.12 |
| 2006/0244868 A1* | 11/2006 | Jia et al. | 348/701 |
| 2007/0050956 A1* | 3/2007 | Hu | 24/598.2 |
| 2007/0069980 A1* | 3/2007 | MacInnis | 345/58 |
| 2007/0071095 A1* | 3/2007 | Lim | 375/240.08 |
| 2007/0183512 A1* | 8/2007 | Li et al. | 375/240.27 |

* cited by examiner

FIG. 1

ADAPFILT

ADAPFILT (in, temp, offset, T1, T2)

$$= temp_j + \min\left(1, f\left(|in_j - temp_j|\right) + offset\right) \times \left(in_j - temp_j\right)$$

where $f\left(|in_j - temp_j|\right) = \begin{cases} 0 & \text{if } |in_j\text{-}temp_j| < T1 \\ \dfrac{\left(|in_j - temp_j|\right) - T1}{T2 - T1} & \text{else if } |in_j\text{-}temp_j| < T2 \\ 1 & \text{otherwise} \end{cases}$

*offset* IS A FLOAT NUMBER IN $[0,1]$   $T_1$ IS AN INTEGER IN $[0, 255]$.   $T_2$-$T_1$ IS LIMITED TO $\{1,2,4,8,16,32\}$   THE INTERNAL OPERATION OF THE INSTRUCTION ARE SHOWN IN FIG. 3.

ABSERR

$$ABSERR(B_1, B_2) = \sum_{i,j} |B_1(i,j) - B_2(i,j)|$$

WHERE $B_1$ AND $B_2$ ARE TWO PIXEL BLOCKS.

PREDACT

THE INSTRUCTION IS USED TO CALCULATE THE ACTIVITIES OF A BLOCK.

TABLE I

| SYMBOL | MEANING | RANGE | DEFAULT VALUE |
|---|---|---|---|
| ME2_search_range_x | Search range of ME2 | | 4 |
| ME2_search_range_y | | | 2 |
| ME3_search_range_x | Search range of ME3 | | 3 |
| ME3_search_range_y | | | 3 |
| ME2_zero_bias | Bias to (0,0) | | 64 |
| ME3_zero_bias | Bias to search centre | | 32 |
| T1_Scale | T1 = MinSAD/T1_scale | 1 ~ 255 | 8 |
| NF_Strength | Noise filter strength (0- disable noise filtering) | 0 ~ 7 | 3 |
| T1min | Minimum T1 | 0 ~ 255 | 0 |
| $\alpha$ | MinSAD1 = $\alpha$ * MinSAD | | 2 |
| NL_SaturationLimitBlack | Block DC black level limit | 0 ~ 255 | 48 |
| NL_SaturationLimitWhite | Block DC while level limit | 0 ~ 255 | 208 |
| NL_MinSadReset | Noise estimation limit, values above should be reset to 0 | 0 ~ 65535 | 1500 |
| NL_MinSadClip | Noise estimation limit, values above should be clipped | 0 ~ 65535 | 500 |
| SC_Sad2Max | Maximum SAD2 for stationary check | 0 ~ 4095 | 4095 |
| SC_Sad4Min | Minimum SAD4 for stationary check | 0 ~ 4095 | 192 |
| SC_MaxDCdiff | Maximum block DC difference for stat. c. | 0 ~ 255 | 8 |
| SC_ActMin | Minimum activity for stationary check | 0 ~ 4095 | 120 |
| SC_Sad4Max | Maximum SAD4 for stationary check | 0 ~ 4095 | 300 |
| SC_Sad4uvMax | Maximum SAD4UV for stationary check | 0 ~ 4095 | 1024 |
| DC_T1norm | Normal strength filtering T1 for Dot-crawl | 0 ~ 255 | 160 |
| DC_dT | DeltaT dot-crawl filtering | 0 ~ 5 | 0 |
| CC_dT | DeltaT for cross-chroma | 0 ~ 5 | 0 |
| NF_MaxMES | Maximum MES for MCTF filtering | 0 ~ 4095 | 800 |
| NF_Bias | Bias in MCTF luma and chroma | 0 ~ 65535 | 200 |

FIG. 5

NOISE ADAPTIVE 3D COMPOSITE NOISE REDUCTION

FIELD OF THE INVENTION

The present invention relates to digital video filtering generally and, more particularly, to a noise adaptive 3-dimensional composite noise reduction technique.

BACKGROUND OF THE INVENTION

In composite video systems such as National Television System Committee (NTSC) systems and Phase Alternate Line (PAL) systems, color information is transmitted by a color subcarrier superimposed on a luminance signal. Therefore, the luminance signal and a chrominance signal actually share some frequency bands. As a result, two types of artifacts are commonly seen in composite video: cross-chrominance (cross-chroma) artifacts and cross-luminance (cross-luma) artifacts. The cross-chroma artifacts occur when the luminance signal contains frequency components near the color subcarrier frequency and spurious colors are generated in the picture. The cross-chroma artifacts are commonly called "bleeding" or "rainbow effects". The cross-luma artifacts occur around edges of highly saturated colors as a continuous series of crawling dots where color information is confused with luminance information. The cross-luma artifacts are commonly called "dot crawl".

Existing filtering techniques use shimmer detection to identify areas of cross-chroma and cross-luma. Noise detection is conventionally used to control a strength of adaptive noise filtering to improve performance. A noise level is typically estimated either temporally or spatially. Temporal estimations are made from (i) co-located block differences or from residual block energies after motion compensation. Spatial estimations are made from block frequency distributions. Existing techniques can also use motion vectors to detect stationary regions and apply filtering on a block-level where the stationary regions and shimmer are simultaneously detected.

The existing techniques have known failures and limitations resulting in a lack of quality, complexity and expenses. For example, motion compensated noise level measurements are considered reliable. However, motion compensation is expensive both computationally and in terms of memory bandwidth. Therefore, motion compensation noise level measurements are not suitable for many low-end, large volume applications. In another example, spatial (i.e., block frequency distribution) based methods using comparison of measures (i.e., distributions and distributions of co-located measure differences) over a small number of adjacent frames are typically unable to distinguish between high-texture and high noise, particularly in the presence of motion. Furthermore, motion vector analysis is complex. Existing shimmer detection methods are also more complex than is desired for composite noise detection. Existing methods are not bandwidth and computationally efficient for detecting cross-chroma and cross-luma. In particular, no existing method is known to filter a "circular sweep zone plate" correctly due to unique spatio-temporal characteristics. In addition, the existing methods do not explicitly filter differently for cases of strong dot crawl and weak dot crawl.

SUMMARY OF THE INVENTION

The present invention concerns a method for filtering digital video. The method generally comprises the steps of (A) checking a plurality of original blocks in an original field for a plurality of artifacts, wherein detection of the artifacts is based on an adjustable threshold, (B) first filtering each of the original blocks having at least one of the artifacts to remove the at least one artifact and (C) second filtering each of the original blocks lacking at least one of the artifacts to remove noise, wherein the second filtering is (i) motion compensated and (ii) adaptive to a respective noise level in each of the original blocks.

The objects, features and advantages of the present invention include providing a noise adaptive 3-dimensional (3D) composite noise reduction technique that may (i) provide an accurate noise estimation where an entire video frame is high texture if some area is relatively low motion, (ii) provide an accurate noise estimation where an entire video frame is high motion if some area is relatively low textured, (iii) properly estimate noise by rejecting saturated blocks, (iv) provide improved noise reduction on radio-frequency sources received over-the-air subjected to television tuner saturation, (v) provide a low cost and low complexity approach for detecting cross-luma artifacts and cross-chroma artifacts, (vi) provide a cross spatio-temporal sum-of-absolute-differences approach for effectively and efficiently detecting areas with cross-luma artifacts, (vii) correctly process a "circular sweep zone plate" pattern, (viii) filter according to the presence of a strong dot crawl and a weak dot-crawl and/or (ix) provide temporal smoothing of a noise level estimate for improved noise filtering performance.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention concerns a technique for reduction of both cross-luminance (cross-luma) and cross-chrominance (cross-chroma) types of composite artifacts. The technique may be applicable for both National Television System Committee (NTSC) systems and Phase Alternate Line (PAL) systems. The technique generally comprises motion compensated noise filtering to reduce both random noise and composite noise.

In the following description, the NSTC system is assumed, unless explicitly stated otherwise. Consider a sequence of digital video fields (e.g., $ORG_0, ORG_1, ORG_2, \ldots$) with each field containing composite noise. For cross-chroma reduction, the following observations generally apply:

(1) Cross-chroma artifacts that appear in stationary objects in the sequence may oscillate from an original field $ORG_N$ to a previous same-parity field $ORG_{N-2}$ (or $ORG_{N-4}$ for PAL) between two values. A mean of the two values may be an artifact-free chrominance value.

(2) In general, the above first observation does not perfectly hold for cross-chroma artifacts that appear in moving objects in the sequence. However, for moving objects with a constant translational velocity, the above first observation is nearly true.

(3) Cross-chroma artifacts are mainly caused by high frequency luminance signal. However, the luminance frequency may be sufficiently high to get filtered out, while the cross-chroma artifacts persist.

Cross-luma artifacts may be noticeable and annoying to a viewer in stationary areas, along vertical edges of highly saturated colors and along horizontal edges of highly saturated colors. For stationary areas with vertical or horizontal cross-luma artifacts, the following two observations generally apply:

(4) The cross-luma artifacts may oscillate from the original field $ORG_N$ to the previous same-parity field $ORG_{N-2}$ (or $ORG_{N-4}$ for PAL) between two values. A mean of the two values may be an artifact-free luminance value.

(5) Cross-luma artifacts are mainly caused by high frequency chrominance. However, the chrominance frequency may be sufficiently high to get filtered out, while the cross-luma artifacts persist.

Cross-luma artifacts may be filtered based on the above observations. First, stationary areas (e.g., macroblocks or blocks) in the original field $ORG_N$ having cross-luma artifacts may be detected. Thereafter, for the detected stationary areas with cross-luma artifacts, the luminance signals of the original field $ORG_N$ may be averages with the luminance signal in the preceding same-parity field $ORG_{N-2}$ (for NTSC) (or $ORG_{N-4}$ for PAL). If no cross-luma artifacts are detected, motion compensated noise filtering may be performed. The motion compensated noise filtering is generally noise level adaptive.

Cross-chroma artifacts may be similarly filtered. First, the stationary areas with cross-chroma artifacts may be detected. Thereafter, the chrominance signals of the original field $ORG_N$ may be averaged with the chrominance signals in the preceding same-parity field $ORG_{N-2}$ (or $ORG_{N-4}$ for PAL). If no cross-chroma artifacts are detected, motion compensated noise filtering may be performed. The motion compensated noise filtering is generally noise level adaptive.

Figure 1:
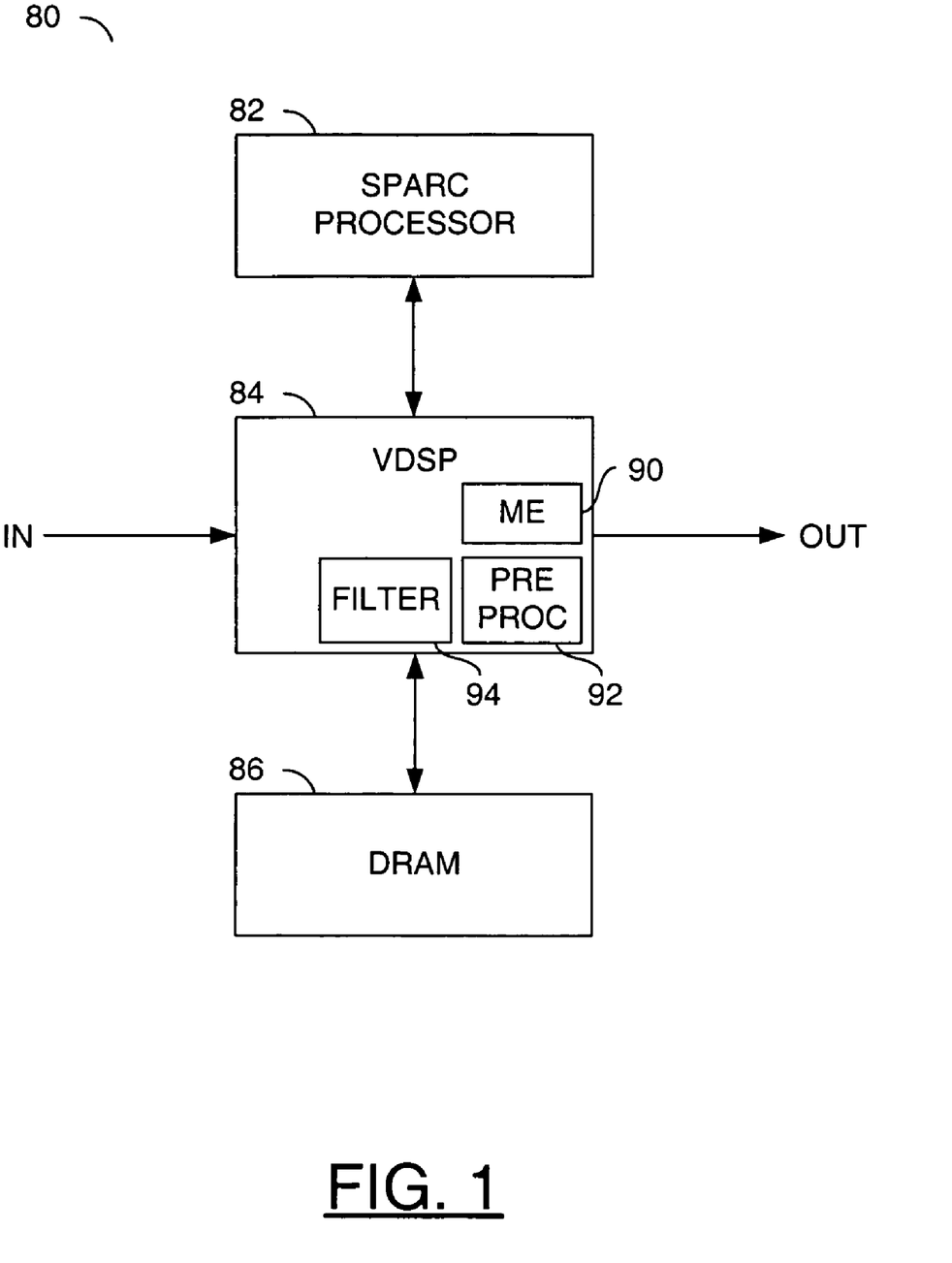
FIG. 1 is a block diagram of an example implementation of a system in accordance with a preferred embodiment of the present invention.

Referring to FIG. 1, a block diagram of an example implementation of a system 80 in accordance with a preferred embodiment of the present invention is shown. The system (or apparatus) 80 may be referred to as a video encoder. The video encoder 80 generally comprises a processor circuit (or module) 82, a processor circuit (or module) 84 and a memory circuit (or module) 86. The processor circuit 84 may be directly coupled to the processor circuit 82 and the memory circuit 86. The signal IN may be received by the processor circuit 84. The signal OUT may be presented by the processor circuit 84.

The processor circuit 82 may be implemented as a SPARC processor. The SPARC processor 82 may be operational to perform detection operations. The SPARC processor 82 may also be operational to control the processor circuit 84. Other types of processors may be implemented to meet the criteria of a particular application.

The processor circuit 84 may be implemented as a video digital signal processor (VDSP) circuit. The VDSP circuit 84 may be operational to perform filtering operations. The VDSP circuit 84 may be controlled by the SPARC processor 82.

The memory circuit 86 may be implemented as a dynamic random access memory (DRAM). The DRAM 86 may be operational to store or buffer large amounts of information consumed and generated by the encoding operations and the filtering operations of the video encoder 80. The DRAM 86 may be implemented as a double data rate (DDR) memory. Other memory technologies may be implemented to meet the criteria of a particular application.

The VDSP circuit 84 generally comprises a circuit (or module) 90, a circuit (or module) 92 and a circuit (or module) 94. The circuit 90 may be referred to as a motion estimation (ME) circuit. The ME circuit 90 may be operational to detect a motion of an original block from one or more reference frames and/or fields. The circuit 92 may be referred to as a pre-processing circuit. The pre-processing circuit 92 may be operational to calculate intra-block activity at a block level and/or an average field level. The circuit 94 may be referred to as a filter circuit. The filter circuit 94 may be operational to blend two blocks from two different fields.

A detailed description of the process (or method) of the present invention is provided below. To address different resource constraints/performance criteria, some tools (circuits or modules) may be removed with just a small filtering efficiency loss.

Figure 2:
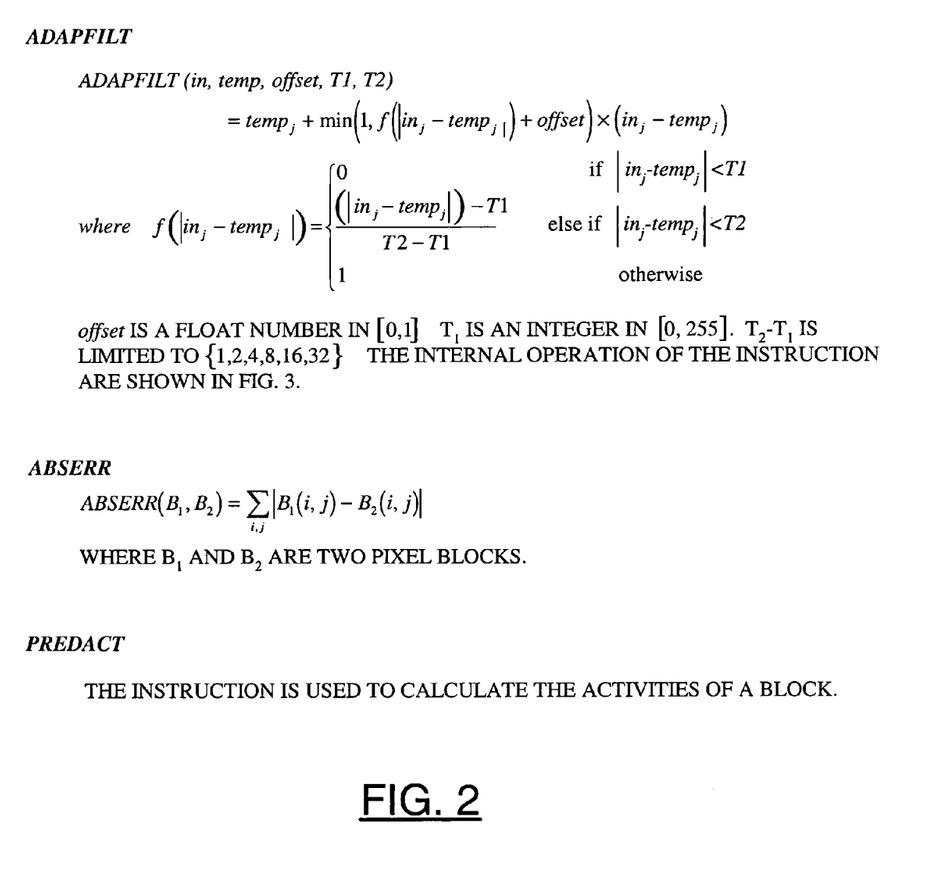
FIG. 2 is set of functions.

Referring to FIG. 2, a set of functions are illustrated. The functions (or instructions) ADAPFILT (adaptive filter), ABSERR (accumulated absolute difference) and PREDACT (prediction activity) generally define video digital signal processing instructions suitable for implementing the present invention. The functions ADAPFILT, ABSERR and PREDACT may be performed by the VDSP circuit 84.

Figure 3:
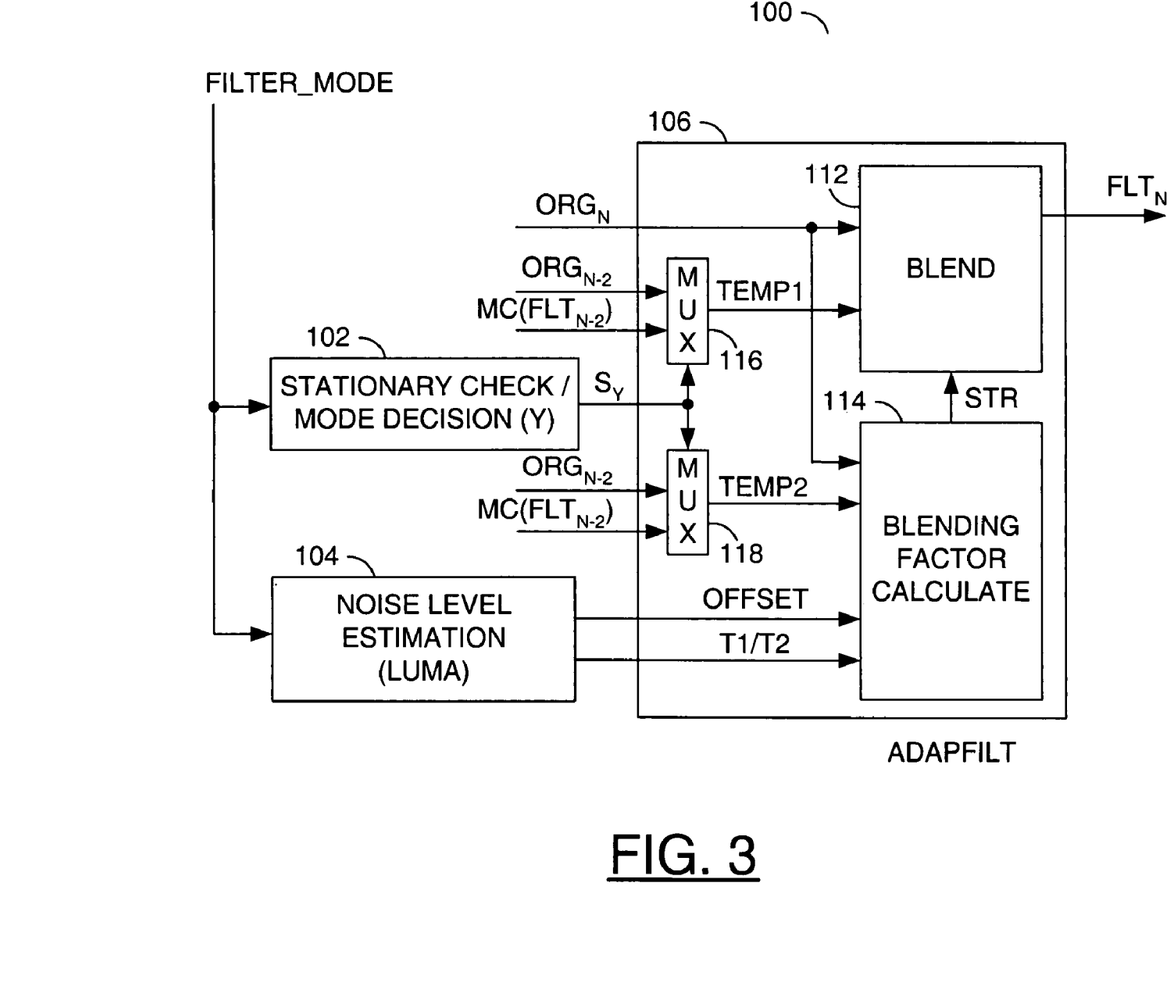
FIG. 3 is a block diagram of an example implementation of a first filter circuit.

Referring to FIG. 3, a block diagram of an example implementation of a first filter circuit 100 is shown. The filter circuit 100 may be the filter circuit 94 in the VDSP circuit 84. The filter circuit (or module) generally comprises a circuit (or module) 102, a circuit (or module) 104 and a circuit (or module) 106. The filter circuit 100 may be configured for luma processing. In particular, the filter circuit 100 may be suitable for filtering random noise and/or cross-chroma artifacts generated in a composite video signal.

A signal (e.g., FILTER_MODE) may be received by the circuits 102 and 104. A signal (e.g., $S_y$) may be presented from the circuit 102 to the circuit 106. Signals (e.g., OFFSET, T1 and T2) may be presented from the circuit 104 to the circuit 106. A original filtered field (e.g., $FLT_n$) may be generated and presented from the circuit 106. The circuit 106 may also receive the original field $ORG_N$, the previous same-parity field $ORG_{N-2}$ and a previous motion-compensated filtered same-parity field (e.g., $MC(FLT_{N-2})$).

The circuit 102 may be referred to as a stationary check circuit, or "check circuit" for short. The check circuit 102 may be operational to perform stationary checks on the luminance elements of the original blocks within the original field $ORG_N$, one original block at a time. The check circuit 102 may also be operation to generate and present the signal $S_y$ in response to the stationary checks. If an original block is stationary, the signal $S_y$ may have a first (e.g., stationary) state. If the original block is moving, the signal $S_y$ may have a second (e.g., moving) state.

The circuit 104 may be referred to as a noise level estimation circuit. The noise level estimation circuit 104 may be operational to perform noise estimations on the luminance elements of the original blocks in the original field $ORG_N$, one original block at a time. Further details of the noise level estimation circuit 104 are generally provided below.

The circuit 106 may be referred to as an adaptive filter circuit. The adaptive filter circuit 106 may be operational to filter artifacts and/or random noise from the original blocks. The adaptive filter circuit 106 may switch between different modes of filtering based on the signal $S_y$.

The adaptive filter circuit 106 generally comprises a circuit (or module) 112, a circuit (or module) 114, a multiplexer (or module) 116 and a multiplexer (or module) 118. The circuit 112 may receive the original field $ORG_N$, a temporary field (e.g., TEMP1) and a strength value (e.g., STR). The circuit 114 may receive the original field $ORG_N$, a temporary field (e.g., TEMP2) and the signals OFFSET, T1 and T2. The circuit 114 may generate and present the strength value STR.

The adaptive filter circuit 112 may generate and present the original filtered field $FLT_N$. The circuit 114 may receive the original field $ORG_N$, a temporary field (e.g., TEMP2), the signal OFFSET and the signals T1 and T2. The multiplexer 116 may receive the previous same-parity field $ORG_{N-2}$, the previous motion-compensated filtered same-parity field $MC(FLT_{N-2})$ and the signal $S_y$. The multiplexer 116 may present the first temporary field TEMP1 to the circuit 112 based on the signal $S_y$. The multiplexer 118 may receive the previous same-parity field $ORG_{N-2}$, the previous motion-compensated filtered same-parity field MC $(FLT_{N-2})$ and the signal $S_y$. The multiplexer 118 may presented the second temporary field TEMP2 to the circuit 114 based on the signal $S_y$. The circuit 114 may present the strength value STR to the circuit 112.

The circuit 112 may be referred to as a blend circuit. The blend circuit 112 may be operational to blend the original field $ORG_N$ with the first temporary field TEMP1 based on the strength value STR. The first temporary field TEMP1 may be one of the previous same-parity field $ORG_{N-2}$ or the previous motion-compensated filtered same-parity field MC $(FLT_{N-2})$ as determined by the select signal $S_y$.

The circuit 114 may be referred to as a blend factor calculate circuit, or "calculate circuit" for short. The calculate circuit 114 may be operational to generate the strength value STR based on the original field $ORG_N$, the second temporary field TEMP2, OFFSET, T1 and T2. The second temporary field TEMP2 may be one of the previous same-parity field $ORG_{N-2}$ or the previous motion-compensated filtered same-parity field $MC(FLT_{N-2})$ as determined by the select signal $S_y$.

Figure 4:
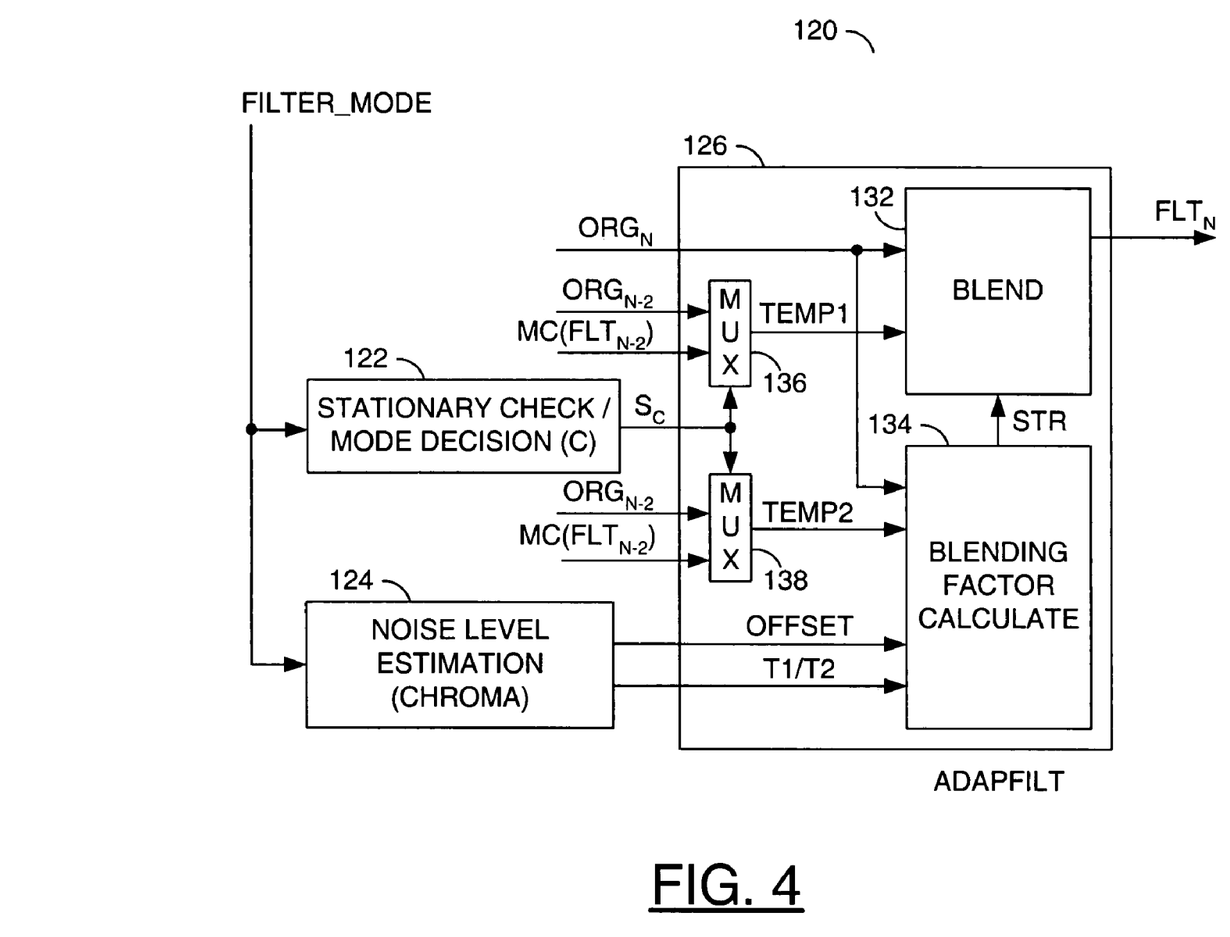
FIG. 4 is a block diagram of an example implementation of a second filter circuit.

Referring to FIG. 4, a block diagram of an example implementation of a second filter circuit 120 is shown. The filter circuit 120 may be the filter circuit 94 in the VDSP circuit 84. The system (or circuit) 120 generally comprises a circuit (or module) 122, a circuit (or module) 124 and a circuit (or module) 126. The filter circuit 120 may be configured for chroma processing. In particular, the filter circuit 120 may be suitable for filtering random noise and/or cross-luma artifacts generated in the composite video signal. In some embodiments, the filter circuit 120 may be implemented with the same hardware as the filter circuit 100. In such embodiments, the filter circuit may operate on luminance data in a first pass and chrominance data in a second pass.

The signal FILTER_MODE may be received by the circuits 122 and 124. The signal $S_c$ may be presented from the circuit 122 to the circuit 126. The signals OFFSET, T1 and T2 may be presented from the circuit 124 to the circuit 126. The original filtered field $FTL_N$ may be presented from the circuit 126. The circuit 126 may also receive the original field $ORG_N$, the previous same-parity field $ORG_{N-2}$ and the previous motion-compensated filtered same-parity field $MC(FLT_{N-2})$.

The circuit 122 may be referred to as a stationary check circuit, or "check circuit" for short. The check circuit 122 may be operational to perform a stationary check on each of the original blocks in the original field $ORG_N$. The check circuit 122 may also be operational to generate and present the signal $S_c$ in response to the stationary checks. If an original block is stationary, the signal $S_c$ may have a first (e.g., stationary) state. If an original block is moving, the signal $S_c$ may have a second (e.g., moving) state.

The circuit 124 may be referred to as a noise level estimation circuit. The noise level estimation circuit 124 may be operational to perform noise estimations on the chrominance elements of the original blocks in the original field $ORG_N$, one original block at a time. Further details of the noise level estimation circuit 124 are generally provided below.

The circuit 126 may be referred to as an adaptive filter circuit. The adaptive filter circuit 126 may be operational to temporally filter artifacts and/or random noise from the original blocks, one block at a time. The adaptive filter circuit 126 may switch between different modes of filtering based on the signal $S_c$.

The adaptive filter circuit 126 generally comprises a blend circuit (or module) 132, a calculate circuit (or module) 134, a multiplexer (or module) 136 and a multiplexer (or module) 138. The circuit 132 may receive the original field $ORG_N$, a temporary field (e.g., TEMP1) and a strength value (e.g., STR) The circuit 134 may receive the original field $ORG_N$, a temporary field (e.g., TEMP2) and the signals OFFSET, T1 and T2. The circuit 134 may generate and present the strength value STR.

The circuit 132 may generate and present the original filtered field $FLT_N$. The circuit 134 may receive the original field $ORG_N$, a temporary field (e.g., TEMP2), the signal OFFSET and the signals T1 and T2. The multiplexer 136 may receive the previous same-parity field $ORG_{N-2}$, the previous motion-compensated filtered same-parity field $MC(FLT_{N-2})$ and the signal $S_c$. The multiplexer 136 may present the first temporary field TEMP1 to the circuit 132 based on the signal $S_c$. The multiplexer 138 may receive the previous same-parity field $ORG_{N-2}$ the previous motion-compensated filtered same-parity field $MC(FLT_{N-2})$ and the signal $S_c$. The multiplexer 138 may presented the second temporary field TEMP2 to the circuit 134 based on the signal $S_c$. The circuit 134 may present the strength value STR to the circuit 132.

The circuit 132 may be referred to as a blend circuit. The blend circuit 132 may be operational to blend the original field $ORG_N$ with the first temporary field TEMP1 based on the strength value STR. The first temporary field TEMP1 may be one of the previous same-parity field $ORG_{N-2}$ or the previous motion-compensated filtered same-parity field MC $(FLT_{N-2})$ as determined by the select signal $S_c$.

The circuit 134 may be referred to as a blend factor calculate circuit, or "calculate circuit" for short. The calculate circuit 134 may be operational to generate the strength value STR based on the original field $ORG_N$, the second temporary field TEMP2, OFFSET, T1 and T2. The second temporary field TEMP2 may be one of the previous same-parity field $ORG_{N-2}$ or the previous motion-compensated filtered same-parity field MC $(FLT_{N-2})$ as determined by the select signal $S_c$.

In both of the FIGS. 3 and 4, for the PAL systems, the original field $ORG_{N-2}$ in the top MUXs (e.g., 116 and 136) may be replaced with the previous original field $ORG_{N-4}$. The notations in FIG. 1 and FIG. 4 are generally explained in the following:

FILTER_MODE: A signal specifying a filtering mode.

$ORG_K$: An original (current) field. The fields $ORG_K$ and $ORG_{K-1}$ generally have opposite polarities. The fields $ORG_K$ and $ORG_{K-2}$ may have the same parity.

$FLT_K$: A temporally filtered version of the field $ORG_K$ $MC(FLT_{K-2})$: A motion compensated version of the filtered field $FLT_{K-2}$ (with $ORG_K$ as target and $FLT_{K-2}$ as reference).

OFFSET: A signal conveying blending factor offset for the original block.

T1 and T2: Signals carrying blending thresholds for the original block.

At a picture level, the signal FILTER_MODE generally controls the behavior of the filter circuits 94, 100 and/or 120 by indicating one among the following options:

(1) No_Filtering mode: The video data may not be modified in the No_Filtering mode. The No_Filtering mode may be used (i) for a first frame after a scene change and (ii) during fades.

(2) MCTF_Only mode: No composite noise filtering is performed in the MCTF_Only mode. The MCTF_Only mode may be used for a second frame after a scene change.

(3) Full_Mode: Composite noise filtering or motion compensated noise filtering is performed adaptively on the block level in the Full_Mode.

For the composite artifacts filtering, the filtering value (parameter) conveyed by the signal OFFSET is generally set to a mid-value (e.g., 0.5) to perform an exact averaging between the two fields. The values (parameters) conveyed by the signals T1 and T2 (where deltaT=T1−T2) may be set adaptively based on the signal level of the cross-luma artifacts on the block level. For cross-chroma filtering, T1 and T2 may be constants. In practice, T1 and T2 may be set large enough so the composite artifacts will get filtered, but not too large to cause any new visible artifacts. A dynamic range of the composite artifacts is generally smaller than the full signal range.

The random noise filtering is generally performed all the time in all areas, except for the areas that have been filtered for composite noise artifacts. Parameters used in the random noise filtering may be dynamically adjusted based on the detected noise levels in the video signal. If no noise is measured in the video signal, no filtering or just a very small filtering may be performed. For video signals with measured noise, the filtering parameters may set in such a way that any pixels with differences above the noise levels may not get filtered, but any pixels below the noise levels may get filtered with a user settable strength.

Ideally, the composite artifact filtering should be performed in a first pass only on the original blocks of the original field $ORG_N$ with some strong evidence of the composite artifacts. Once the artifacts are removed in the first pass, a second pass of motion compensated random noise filtering may be performed on some blocks (without artifacts) or all of the original blocks. While the composite artifact filtering is generally very effective in reducing the artifacts, the artifact filtering may reduce the random noise in the filtered areas just slightly. On the other hand, the motion compensated noise filtering is generally very effective in reducing the random noise in the video. Therefore, the second pass for motion compensated noise filtering may be performed for all areas. The filter circuits 94, 100 and 120 generally perform temporal filtering on the luminance data and the chrominance data for the purpose of reducing random noise and composite artifacts.

A block level filtering mode decision may be performed to determine whether to execute composite artifact filtering and/or motion compensated noise filtering. The block level filtering mode decision is generally conducted for both luma processing and chroma processing. The following notations may be used:

MES: A Motion Estimation Score value of the original block in the original field $ORG_N$ with the previous filtered same-parity field $FLT_{N-2}$ being the reference. The MES may be generated by the ME circuit 90.

SAD2: A Sum-Of-Absolute-Differences (SAD) value between the original luma block in the original field $ORG_N$ and a co-located block in the previous same-parity field $ORG_{N-2}$.

SAD4: A SAD value between the original luma block in the original field $ORG_N$ and a co-located block in the previous same-parity field $ORG_{N-4}$.

ACT: An intra-block activity value of the original luma block. An ADAPACT instruction generally calculates activity measurements by summing the vertical and the horizontal absolute differences within a 16V×8 H region. The macroblock intra activity ACT is generally minimum of a total frame activity and a total field activity within the macroblock. The value ACT for a block i may be calculated as follows:

Frame_Act (i) = [ (LTF (i) +RTF (i) +LBF (i) +LRF (i))>> 1] & ~1
Field_Act (i) = [LSf (i) +RSf (i))>> 1] | 1
ACT=MIN[Frame_Act (i), Field_Act (i)]

where "L" indicates left, "R" indicates right, "F" indicates frame, "f" indicates field, "T" indicates top, "B" indicates bottom, "O" indicates odd and "E" indicates even.

ACTV: A vertical intra-block activity of the original luma block.

ACTH: A horizontal intra-block activity of the original luma block.

MinSAD: A minimum noise level for all the blocks in the original field $ORG_N$. In calculating the value MinSAD, the boundary macroblocks in the original field $ORG_N$ may be excluded. If saturation of the video signal is possible (the noise signal is removed), the blocks close to the saturation limits of the signal may be excluded.

MinSAD1: A level of random noise in the original field $ORG_M$. The value MinSAD1 may be estimated as α×MinSAD, where α is generally a programmable parameter with default value 2.

DCurr: A dot-crawl (DC) value of the current 8×8 luma block obtained from the instruction ABSERR, where a block of all zero values may be used as a second input into the instruction ABSERR. The value DCurr may be calculated by dividing a result generated by the instruction ABSERR by a predetermined constant (e.g., 64).

DCcolo: A dot-crawl value of an 8×8 luma block that is colocated with the current 8×8 luma block used for the value DCurr in a same parity field in the previous field $ORG_{N-2}$. The value DCcolo may be obtained from the instruction ABSERR, where a block of all zero values may be used as a second input into the instruction ABSERR. The value DCcolo may be calculated by dividing a result generated by the instruction ABSERR by a predetermined constant (e.g., 64).

SAD2UV: A SAD value between the two original chroma blocks in the original field $ORG_N$ and a co-located block in the previous field $ORG_{N-2}$.

SAD4UV: A SAD value between the two original chroma blocks in original field $ORG_N$ and a co-located block in the previous field $ORG_{N-4}$.

Dot_Crawl_Colo: A dot crawl decision for the colocated same parity field block. A value for the decision Dot_Crawl_Colo may have a value of true when dot crawl is detected and false when dot crawl in not detected.

Cross_Chroma_Colo: A cross-chroma decision for the colocated block. A value for the decision Cross_Chroma_Colo may have a value of true when cross-chroma noise is detected and a false when no cross-chroma noise is detected.

Colo_MB_Stationary: A decision that may be set to true if all four 8×8 blocks in the colocated same-parity filed 16×16 macroblock are marked as stationary. If one or more of the 8×8 blocks is marked as moving, the decision may be set to false.

Due to a configuration of a data memory module (DMEM) in motion compensated temporal filtering and the constraints of the instruction ABSERR (horizontal offset in 8-pel words) in one embodiment, the values MES UV, SAD2UV and SAD4UV may be calculated from two adjacent chrominance blocks within the same macroblock and the values for both chroma channels are added together. If the value for MinSAD is not available for the original field, the value for the previous field may be used with just a small efficiency loss. Several of the parameters above may be modified as follows:

```
SAD2' = MAX (0, SAD2 – MinSAD1)
SAD4' = MAX (0, SAD4 – MinSAD1)
SAD2UV' = MAX (0, SAD2UV – MinSAD1)
SAD4UV' = MAX (0, SAD4UV – MinSAD1)
ACT' = Max (0, ACT – MinSAD1)
```

Figure 5:
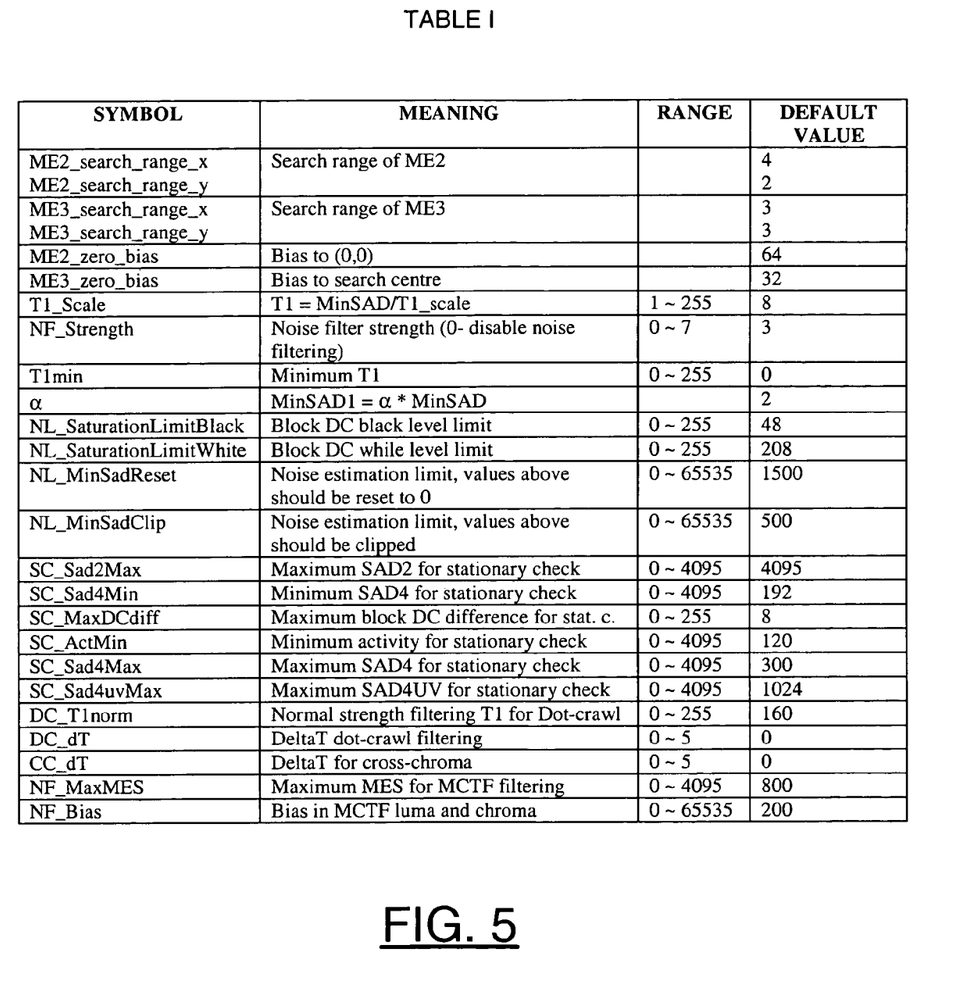
FIG. 5 is a table of programmable parameters.

For each 8×8 block, a stationary check may be evaluated first using the conditions below. Only stationary blocks may be filtered for dot-crawl or cross-chroma artifacts. If all of the following conditions are satisfied, a variable (e.g., Block_Stationary) is set to true. If one or more of the following conditions is not satisfied, the value Block_Stationary may be set to false:

```
FILTER = Full_Mode
abs (DCcurr-DCcolo)< SC_MaxDCdiff
SAD2' <= (Max(ACT', SC_ActMin) × 2))
SAD2' < SC_Sad2Max
SAD4' < Max(SC_Sad4Min, (ACT'>>2))
SAD4UV' < SC_Sad4uvMax
``` where SC_MaxDCdiff, SC_ActMin, SC_Sad2Max, SC_Sad4Min and SC_Sad4uvMax may be programmable parameters with default values specified in TABLE I shown in FIG. 5. Otherwise, motion compensated luma noise filtering may be performed. The above conditions may be determined by software executing in the SPARC processor circuit 82. Motion vectors are generally not use to perform the stationary check. Instead, a block may be considered to be stationary if the values SAD2 and SAD4 are sufficiently small. The condition for the SAD2 is generally more relaxed since SAD2 may be higher if dot-crawl is present.

For each 8×8 luma block, the variable Dot_Crawl is generally evaluated as follows:

```
Dot_Crawl = ( (Block_Stationary= =true)
&& (SAD2' > (SAD4' × 3/2)
&& (SAD4'< SC_Sad4Max))
```

Cross luma filtering is generally performed, if all of the following conditions are satisfied:

```
Dot_Crawl = true
Dot_Crawl_Colo = true
Colo_MB_Stationary = true
``` where SC_Sad4Max may be a programmable parameter with default values specified in TABLE I shown in FIG. 5. Otherwise, motion compensated chroma noise filtering may be performed. The above conditions may be determined by software executing in the SPARC processor circuit 82.

For each 8×4 chroma block (e.g., generally corresponding to a 16×8 luma block size for 4:2:0 chroma coding composed of left 8×8 and right 8×8 blocks), the variable Cross_Chroma may be set to true if all of the conditions below are true:

```
Block_Stationary[left_8×8] = true
Block_Stationary[right_8×8] = true
SAD2UV'>(SAD4UV' × 2)
```

Cross-chroma filtering is generally performed if both conditions below are true:

```
Cross_Chroma = true
Cross_Chroma_Colo = true
```

Otherwise, motion compensated chroma noise filtering may be performed. The chroma filtering mode decision is generally common for both the left 4×4 chroma block and the right 4×4 chroma block in both the U channel and the V channel.

Video filtering may be performed by the filter circuit 100. For cross-luma (dot-crawl) filtering, the adaptive filter circuit 106 may be used to perform temporal filtering on luminance data in the original field $ORG_N$. In particular, the adaptive filter circuit 106 may generate the original filtered field $FLT_N$ from the original field $ORG_N$ and the previous same-parity field $ORG_{N-2}$ as follows:

$$FTL_N = \text{ADAPFILT}(ORG_N, ORG_{N-2}, \text{OFFSET}, T1, \text{deltaT})$$

where the parameter OFFSET may be set to 0.5. The parameter T1 may be set to DC_T1norm. The parameter deltaT may be set to a dot-crawl difference value (e.g., DC_dT). The parameter DC_dT is generally a programmable parameters with default values specified in TABLE I in FIG. 5. In the above case, blending the original field $ORG_N$ with the previous same-parity field $ORG_{N-2}$ generally reduces cross-luma noise (artifacts) and may reduce random noise.

Cross-chroma filtering may be performed by the filter circuit 120. The blend circuit 126 generally performs temporal filtering on chrominance data in the original field $ORG_N$. In particular, the blend circuit 126 may generate the original filtered field $FLT_N$ from the original field $ORG_N$ and the previous same-parity field $ORG_{N-2}$ as follows:

$$FTL_N = \text{ADAPFILT}(ORG_N, ORG_{N-2}, \text{OFFSET}, T1, \text{deltaT})$$

where the parameter OFFSET may be set to 0.5. The parameter T1 is generally set to 255. The parameter deltaT may be set to a cross-chroma difference value (e.g., CC_dT). The value CC_dT may be a programmable parameter with default value specified in TABLE I in FIG. 5. In the above case, blending the original field $ORG_N$ with the previous same-parity field $ORG_{N-2}$ generally reduces cross-chroma noise and may reduce random noise.

Motion compensated luma noise filtering may be performed by the filter circuit 100. The original filtered field $FLT_N$ may be generated from the original field $ORG_N$ and the previous motion-compensated filtered same-parity field $MC(FLT_{N-2})$ as follows:

$$FTL_N = ADAPFILT(ORG_N, ORG_{N-2}, OFFSET, T1, deltaT)$$

The adaptive filter circuit 106 may blend the original field $ORG_N$ with the motion compensated field $MC(FLT_{N-2})$ with the blending factor STR calculated from the field $ORG_N$, the filed MC ($FLT_{N-2}$), the parameter OFFSET, the parameter T1 and the parameter deltaT.

The parameter OFFSET may be set to 255 (e.g., no filtering) if any one or more of the following three conditions is satisfied:

> FILTER_MODE is set to No_Filtering;
> MES > (MIN(NF_MaxMES, ACT × 3/4) + NF_Bias
> SAD2' > (ACT' × 3) + NF_Bias where NF_Bias and NF_MaxMES may be a programmable parameters with default values specified in TABLE I. Otherwise, the parameter OFFSET may be set to F_TAB[NF_Strength], where F_TAB={255, 191, 127, 95, 63, 47, 31, 23} and NF_Strength may be an index. The index NF_Strength may have a default value of 3. The above conditions may be evaluated by software executing in the SPARC processor 82.

For the motion compensated luma noise filtering, the parameter T1 is generally based on a measured noise level as follows:

$$T1 = MAX(MinSAD/T1\_Scale, T1min)$$

where T1_Scale and T1min may be programmable parameters with default values specified in TABLE I in FIG. 5.

The parameter deltaT is generally derived from T1 as follows:

$$deltaT = MIN(floor(log2(MAX(T1, 1))), 5)$$

Motion compensated chrominance noise filtering is generally performed in the same way as the motion compensated luminance filtering using the same parameters as described above, except the calculation of the parameter OFFSET for motion compensated chroma noise filtering, the parameter OFFSET may be calculated as follows. The parameter OFFSET may be set to 255 (e.g., no filtering) if any one or more of the following two conditions is satisfied:

> FILTER_MODE is set to No_Filtering
> SAD2_UV' > MIN(ACT' [left_8×8], ACT' [right_8×8]) + NF_Bias where NF_Bias may be a programmable parameter with a default value specified in TABLE I. Otherwise, the parameter OFFSET may be set to F_TAB[NF_Strength], where F_TAB={255, 191, 127, 95, 63, 47, 31, 23} and NF_Strength may be an index. The index NF_Strength may have a default value of 3. The offset may be common for the left 4×4 and the right 4×4 chroma block in both chrominance channels. The above conditions may be evaluated by the software executing in the SPARC processor 82.

Noise level estimates may be determined by the VDSP circuit 84. As stated above, the motion compensated temporal noise filtering is generally noise level adaptive. The motion compensated temporal noise filtering may be performed on all blocks (other than blocks with composite artifacts). However, the instruction ADAPFILT may be configured in such a way that the filter circuits 100 and 120 may not filter signals with large pixel differences (e.g., smooth edges) if the motion search does not find a perfect match in the previously filtered field. The filter circuits 100 and 120 may be configured to filter only if the pixel differences are below the noise levels.

Several benefits of noise level adaptive filtering may realized by the present invention. No filtering may be performed if there is no noise in the video, which minimizes unwanted distortion. The noise may be filtered with very strong settings without causing any distortion, detail or sharpness loss. No extra logic circuits may be implemented for an existing design to configure the filter. No user parameter change may be implemented for sequences with different noise levels simplifying the user interface.

The noise level estimate is generally based on SAD and intra-block activity between the original field $ORG_N$ and the previous same-parity field $ORG_{N-2}$. The minimum of the values SAD2, SAD4, MES, ACT, ACTV and ACTH within the field may be a good measure of the noise level present. Given no motion, or just a small motion within flat areas, the value SAD2 generally provides a good noise estimate. For blocks with dot-crawl noise, the value SAD2 may be higher and thus the value SAD4 may also be used. The value MES may help during global pans. For scene changes, fades or quick pans, the intra activity may be a good backup method for estimating the noise levels. Furthermore, the activity for a flat block with noise has been observed to be close to the value SAD2, but usually not smaller. The horizontal activities and the vertical activities may be included to determine a correct noise level for signals with strong horizontal scrolling patterns and/or strong vertical scrolling patterns for which all other measures fail. The boundary macroblocks may be excluded from the noise estimation. A content of the boundary macroblock generally does not correctly reflect the nosie present in the video.

For saturated luma signals and/or saturated chroma signals, the noise is typically removed. For a saturated signal, the noise detection would generally detect no noise present. To improve the situation, blocks with saturated values may be excluded from the noise level estimations. An easy way to check for the signal saturation is by re-using the value DCcurr of each block. The DC value for a saturated block will generally be close to 0 or 255.

A last safety check for the noise estimation may involve (i) comparing the value MinSad with a particular threshold (e.g., NF_Strength) and (ii) resetting the noise estimate to zero if above the threshold NF_Strength. The above approach generally avoids some strong filtering if the noise estimation fails for any reason. The default value for the threshold NF_Strength is generally specified in TABLE I in FIG. 5. The value for the threshold NF_Strength may be clipped so as not to exceed a certain limit.

If the noise level is changing slowly during the video sequence, the noise estimates collected during the previous field may be used. If the noise level is expected to be higher, a temporal smoothing of the value MinSAD may be performed. A process flow for estimating the nosie level may be as follows:

MinSAD value is generally initialized to 0.

At the beginning of each new field, a value MinSADcurr may be set to the largest integer value.

Boundary macroblocks may not be included in the noise estimation.

The DC value for each macroblock is generally calculated by adding four DCcurr block values within the macroblock, the result is divided by a predetermined number (e.g., 4).

The macroblock DC value may be compared with a black limit value (e.g., NL_SaturationLimitBlack) and the current macroblock may be skipped if the DC value is less or equal to the limit.

The macroblock DC value may be compared with the white limit value(e.g., NL_SaturationLimitWhite) and the current macroblock is skipped if the DC value is grater or equal the limit.

For each block within the macroblock, variable MinSADblock[i] may be set to MIN(SAD2, SAD4, MES, ACT/2, ACTV×2), where ACTV is generally obtained from the instruction ABSERR.

The maximum value of the four MinSADblock[i]values is generally found and compared with the MinSADcurr, and the MinSADcurr may be set to the minimum of those two.

At the end of the current field processing, the value of MinSADcurr may be compared with fieldHorAct×8×3/45/mbh/4 and the value of MinSADcurr may be set to a minimum of the two. The value of FieldHorAct is generally obtained from a video capture module. The variable mbh is generally the field height in macroblocks.

If MinSADcurr is above NL_MinSadReset, the value of MinSADcurr may be reset to 0.

If MinSADcurr is above NL_MinSadClip, the value of MinSADcurr is generally clipped to NL_MinSadClip.

The variable MinSAD may then be set to (MinSADcurr+(7×MinSAD))>>3.

A pseudo-code below generally highlights the above process flow:

```
MinSAD = 0;
For all fields
{
    MinSADcurr = Processfield(MinSAD);
    MinSADcurr = MIN(MinSADcurr, fieldHorAct×8×3/45/mbh/4);
    if (MinSADcurr > NL_MinSadReset)
        MinSADcurr = 0;
    MinSADcurr = MIN(MinSADcurr, NL_MinSadClip);
    MinSAD = (MinSADcurr + 7 × MinSAD)>>3;
}
``` where a function ProcessField generally performs the composite and random noise field filtering using the passed in MinSAD value. The function ProcessField may be operational to return a new calculated MinSADcurr. The noise level estimation may be disabled on scene changes and/or during fades to disable any inter-field noise.

In some embodiments, the VDSP computation load may be reduced by omitting the signal saturation check and/or the check for chroma activity. The saturation check may be omitted if the video signal is not expected to be saturated and/or the signal has just a very small level of noise. In such a case, the saturated signal may disable any noise filtering.

A motion estimation function within the VDSP circuit 84 may be configured to use motion vector cost instead of just a zero motion vector (MV) bias. Using the motion vector cost may reduce dragging artifacts caused by zero motion vectors resulted from zero MV bias, specially for noisy blocks with very little of details. The zero MV bias is otherwise may be used for good noise filtering in flat areas.

Instead of checking for cross-luma artifacts over the entire original field $ORG_N$, a decimated field (e.g., a quarter common interface format field) may be checked. The luma data may be decimated by a factor of 4 in both a horizontal dimension and a vertical dimension (e.g., pixel averaging may be used). The dot-crawl signal may be removed by the decimation and thus may be used to detect the dot-crawl pattern. Furthermore, the decimated field may be already available from a multistage ME function, if already implemented.

Motion vector filtering may be performed on flat areas to improve noise filtering. In flat areas with noise, the ME function tends to find a best match for the noise pattern in the original block instead of finding a true motion. Finding the matching noise instead of the matching video information generally reduces the noise filtering strength. Temporal and/or spatial filtering of the motion vectors may help to find the real motion in for the block.

In textured areas, the ME function generally locks the original block to a proper pattern in the previous field. Therefore, the noise may be nicely removed due to temporal filtering. As such, the motion vector processing may be performed only for flat blocks.

An NTSC signal may contain a dot-crawl signal sufficiently strong to be over several thresholds and thus not get filtered at all. To filter the strong dot-crawl signals, the value of SC_Sad2Max may be increased in the stationary check and the value of DC_T1norm may be increased. The filtering may increase the chances that some periodic motion may get filtered as the dot-crawl not. The improper filtering may cause some significant filtering artifacts.

The dot-crawl/cross-chroma filtering generally uses the previous same-parity fields and the pre-previous same-parity fields. Use of the previous fields generally imposes at least 2 frame delay, before the composite noise filtering is turned on. A temporal filtering may be implemented on the composite noise filtering decision, introducing another frame of delay.

Remove of the above addition 1 frame delay for still pictures video may possibly be removed where the composite artifacts temporary re-appear every time a new picture is displayed. The frame-level still detection may be implemented by counting a number of stationary blocks within each field/frame. Once in the still mode, the temporal filtering of the composite filtering mode decision may be disabled causing a faster switching time. In the still mode, the scene changes are generally ignored to stay in the still mode.

In some situations, the dot-crawl logic may get confused by real non-dot-crawl signals causing filtering artifacts. A good example may be a scrolling horizontal text with double letters. Therefore, the temporal filtering on the mode decision. The artifacts may get reduced by checking the above pixels and below pixels.

Several conclusions were drawn by comparing the original sequences and the processed sequences generated by simulating the present invention. The cross-chroma artifacts on stationary objects may almost be completely removed. Chrominance detail loss caused by the present invention is generally not noticeable. Cross-luma artifacts may be dramatically reduced. Random noise may be greatly reduced across sequences with different noise levels, especially in textured areas. No visible detail loss or distortion is generally observed at low noise levels. No dragging artifacts may be visible. Dot-crawl filtering may sometimes cause artifacts when the dot-crawl is being simulated by some periodic motion.

The 12-bit parameter range (0-4095) is generally defined to allow a quick constant setup on SPARC based architectures. If the parameters are implemented with more than 12 bits, the values that the parameters are compared against may be down shifted accordingly to keep the parameter values within the 12-bit range.

The functions performed by the diagrams of FIGS. 1-4 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method for filtering digital video, comprising the steps of:
   (A) checking a plurality of original blocks in an original field for a plurality of artifacts, wherein detection of said artifacts is based on an adjustable threshold;
   (B) first filtering each of said original blocks having at least one of said artifacts to remove said at least one artifact;
   (C) second filtering each of said original blocks lacking at least one of said artifacts to remove noise, wherein said second filtering is (i) motion compensated and (ii) adaptive to a respective noise level in each of said original blocks;
   (D) measuring said respective noise levels for said original blocks;
   (E) detecting each saturated block of said original blocks in which most of a plurality of pixel values comprise saturated values; and
   (F) excluding said saturated blocks from said measuring of said respective noise levels.

2. The method according to claim 1, further comprising the step of:
   measuring said respective noise levels for said original blocks based on a plurality of sum-of-absolute-differences values between said original blocks and a plurality of previous blocks in a previous field, wherein said previous field has a same parity as said original field.

3. The method according to claim 1, further comprising the step of:
   measuring said respective noise levels for said original blocks based on a plurality of intra-block activities of said original blocks.

4. The method according to claim 1, further comprising the step of:
   measuring said respective noise levels for said original blocks based on a plurality of sum-of-absolute-differences values between a plurality of even line in said original blocks and a plurality of odd lines in a plurality of previous blocks in a previous field, wherein said previous field has a same parity as said original field.

5. The method according to claim 1, further comprising the steps of:
   measuring an activity in each of said original blocks; and
   generating said adjustable threshold based on said activity.

6. The method according to claim 1, further comprising the steps of:
   measuring a random noise in said original field; and
   generating said adjustable threshold based on said random noise.

7. The method according to claim 1, further comprising the steps of:
   measuring a strength of dot crawl for each of said original blocks; and
   adjusting said second filtering based on said strength.

8. The method according to claim 1, further comprising the steps of:
   detecting each stationary block of said original blocks; and
   performing said checking of said original blocks for said artifacts only on said stationary blocks.

9. The method according to claim 1, further comprising the step of:
   temporal smoothing a noise estimate used in said second filtering, wherein
   said first filtering is performed for both (i) a plurality of luminance blocks of said original field and (ii) a plurality of chrominance blocks of said original field, and
   said second filtering is performed on all of said original blocks after said first filtering.

10. A system comprising:
    a first processor configured to check a plurality of original blocks in an original field for a plurality of artifacts, wherein detection of said artifacts is based on an adjustable threshold; and
    a second processor configured to (i) artifact filter each of said original blocks having at least one of said artifacts to remove said at least one artifact and (ii) noise filter each of said original blocks lacking at least one of said artifacts to remove noise, wherein (A) said noise filtering is (i) motion compensated and (ii) adaptive to a respective noise level in each of said original blocks and (B) said second processor is further configured to (i) measure said respective noise levels for said original blocks, (ii) detect each saturated block of said original blocks in which most of a plurality of pixel values comprise saturated values and (iii) exclude said saturated blocks from said measuring of said respective noise levels.

11. The system according to claim 10, wherein said second processor is further configured to measure said respective noise levels for said original blocks based on temporal noise differences between said original blocks and a plurality of previous blocks in a previous field, wherein said previous field has a same parity as said original field.

12. The system according to claim 10, wherein said second processor is further configured to measure said respective noise levels for said original blocks based on spatial intra-block activities of said original blocks.

13. The system according to claim 10, wherein said second processor is further configured to measure said respective noise levels for said original blocks based on cross spatio-temporal differences between a plurality of even line in said original blocks and a plurality of odd lines in a plurality of previous blocks in a previous field, wherein said previous field has a same parity as said original field.

14. The system according to claim 10, wherein said second processor is further configured to (i) measure an activity in each of said original blocks and (ii) generate said adjustable threshold based on said activity.

15. The system according to claim 10, wherein said second processor is further configured to (i) measure a random noise in said original field and (ii) generate said adjustable threshold based on said random noise.

16. The system according to claim 10, wherein said second processor is further configured to (i) measure a strength of dot crawl for each of said original blocks and (ii) adjust said noise filtering based on said strength.

17. The system according to claim 10, wherein said second processor is further configured to (i) detect each stationary block of said original blocks and (ii) perform said checking of said original blocks for said artifacts only on said stationary blocks.

18. A system comprising:
   means for checking a plurality of original blocks in an original field for a plurality of artifacts, wherein detection of said artifacts is based on an adjustable threshold;
   means for first filtering each of said original blocks having at least one of said artifacts to remove said at least one artifact;
   means for second filtering each of said original blocks lacking at least one of said artifacts to remove noise, wherein said second filtering is (i) motion compensated and (ii) adaptive to a respective noise level in each of said original blocks; means for measuring said respective noise levels for said original blocks;
   means for detecting each saturated block of said original blocks in which most of a plurality of pixel values comprise saturated values; and
   means for excluding said saturated blocks from said measuring of said respective noise levels.

19. A method for filtering digital video, comprising the steps of:
   (A) checking a plurality of original blocks in an original field for a plurality of artifacts, wherein detection of said artifacts is based on an adjustable threshold;
   (B) first filtering each of said original blocks having at least one of said artifacts to remove said at least one artifact;
   (C) second filtering each of said original blocks lacking at least one of said artifacts to remove noise, wherein said second filtering is (i) motion compensated and (ii) adaptive to a respective noise level in each of said original blocks;
   (D) detecting each stationary block of said original blocks; and
   (E) performing said checking of said original blocks for said artifacts only on said stationary blocks.

20. A method for filtering digital video, comprising the steps of:
   (A) checking a plurality of original blocks in an original field for a plurality of artifacts, wherein detection of said artifacts is based on an adjustable threshold;
   (B) first filtering each of said original blocks having at least one of said artifacts to remove said at least one artifact;
   (C) second filtering each of said original blocks lacking at least one of said artifacts to remove noise, wherein said second filtering is (i) motion compensated and (ii) adaptive to a respective noise level in each of said original blocks; and
   (D) temporal smoothing a noise estimate used in said second filtering, wherein (i) said first filtering is performed for both (a) a plurality of luminance blocks of said original field and (b) a plurality of chrominance blocks of said original field, and (ii) said second filtering is performed on all of said original blocks after said first filtering.

21. A system comprising:
   a first processor configured to check a plurality of original blocks in an original field for a plurality of artifacts, wherein detection of said artifacts is based on an adjustable threshold; and
   a second processor configured to (i) artifact filter each of said original blocks having at least one of said artifacts to remove said at least one artifact, (ii) noise filter each of said original blocks lacking at least one of said artifacts to remove noise, (iii) detect each stationary block of said original blocks and (iv) perform said checking of said original blocks for said artifacts only on said stationary blocks, wherein said noise filtering is (i) motion compensated and (ii) adaptive to a respective noise level in each of said original blocks.

* * * * *